Aug. 9, 1966 M. GLICKSMAN 3,265,107
SEALING THREADED NUT CONSTRUCTION
Filed Feb. 3, 1964

United States Patent Office 3,265,107
Patented August 9, 1966

3,265,107
SEALING THREADED NUT CONSTRUCTION
Milton Glicksman, Teaneck, N.J., assignor to
Multi-Flex Seals, Inc., New York, N.Y.
Filed Feb. 3, 1964, Ser. No. 342,022
1 Claim. (Cl. 151—7)

This invention relates generally to the field of threaded sealing devices used in closing openings in sheet metal forming housings or casings, in which the opening is penetrated by the threaded shank of a screw or similar fastener. Devices of this general type are known in the art, and the invention lies in specific constructional details which permit improved sealing action, ease of installation and lower cost of manufacture.

It is generally known in the art to provide sealing devices in which a metallic nut element is encased within a synethetic resinous boot element, the boot element providing a distortable flange which is pressed against the outer surface of the sheet metal to provide a sealing action. As the boot totally encloses the nut, a sealing action is also provided at the threaded bore of the nut element as well. Such constructions, while useful are relatively costly, owing to the large amount of silicone rubber or other synthetic resinous material required in the formation thereof, and in addition expose the synthetic resinous parts thereof so that they may be subsequently damaged or ruptured by contact with other articles. Once ruptured, the hermetic seal is lost, so that the device loses its ability to provide a sealing function.

It is therefore among the principal objects of the present invention to provide an improved sealing nut construction in which the synthetic resinous parts thereof are completely concealed once the device is installed.

Another object of the invention lies in the provision of an improved sealing nut construction in which the cost of fabrication thereof is materially reduced as contrasted with existing prior art devices, owing to the reduction in the amount of synthetic resinous material required to complete manufacture of the same.

A further object of the invention lies in the provision of an improved threaded sealing device in which a single resilient element performs a sealing function between the metallic nut element and the outer surface of the sheet metal with which it is engaged, and also performs a sealing function about the threaded shank which projects through the opening in the sheet metal.

A feature of the invention lies in the fact that the device may be installed using conventional sockets and wrenches without fear of damaging the relatively delicate resilient element thereof.

Another feature of the invention lies in the fact that owing to the relatively great thickness of the resilient element, the device may be removed and installed many times without damage, thereby permitting reuse of the device many times.

Another feature of the invention lies in the fact that it provides a "lock-nut" function, owing to the presence of resilient engagement of the threads of the threaded shank upon which the device is installed.

These objects and features, as well as other incidental ends and advantages, will more fully appear in the progress of the following disclosure, and be pointed out in the appended claim.

In the drawing, to which reference will be made in the specification, similar reference characters have been employed to designate corresponding parts throughout the several views.

Figure 1:
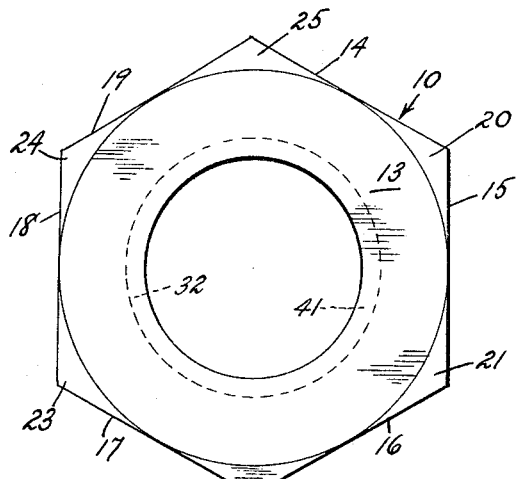
FIGURE 1 is a plan view of an embodiment of the invention.

In accordance with the invention, the device, generally indicated by reference character 10, comprises broadly; a metallic nut element 11 and a resilient nut element 12.

Figure 2:
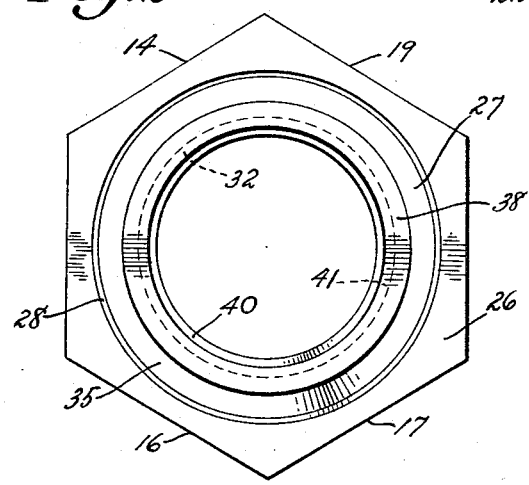
FIGURE 2 is a bottom plan view thereof.
Figure 3:
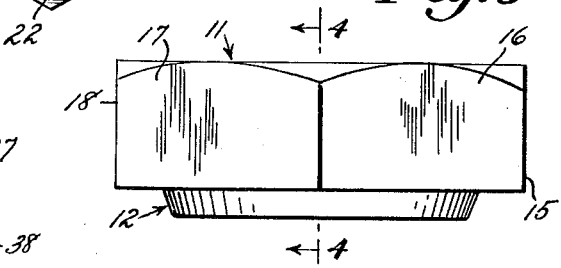
FIGURE 3 is a side elevational view thereof prior to installation.

The metallic nut element 11 may be of generally conventional polygonal type, and as best seen in FIGURES 1–3, inclusive, the element 11 is bounded by an outer surface 13, side surfaces 14, 15, 16, 17, 18 and 19; optional chamfered surfaces 20, 21, 22, 23, 24 and 25. An inner surface 26 is disposed parallel to the outer surface 13, and extending inwardly into the body of the element 11 from the inner surface 26 is an annularly shaped recess 27 bounded by a first conical wall 28, a first bottom wall 29, a second conical wall 30 and a second bottom wall 31. Extending through the nut element 11 from the outer surface 13 to the first bottom wall 29 is a threaded bore 32.

Figure 4:
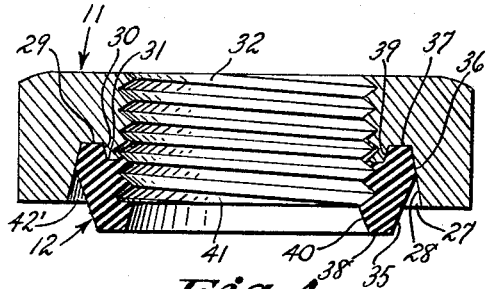
FIGURE 4 is a transverse sectional view thereof as seen from the plane 4—4 in FIGURE 3.
Figure 5:
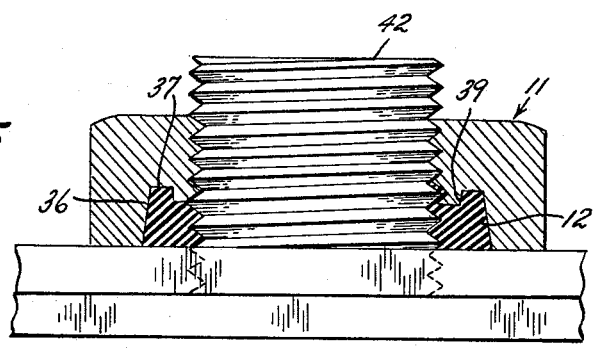
FIGURE 5 is a sectional view corresponding to that seen in FIGURE 4, but showing the device in installed condition.

The resilient nut element 12 is preferably formed from silicone rubber which is preferably cured in situ, although, where desired, other suitable materials such as butyl rubber, neoprene, viton, and other similar materials may be substituted. As best seen in FIGURE 4, the element 12 is of irregular cross section, being bounded by first and second tapered outer surfaces 35 and 36, respectively; first and second end surfaces 37 and 38, respectively; and first and second inner surfaces 39 and 40, respectively. Interconnecting the inner surfaces 39 and 40 is an internally threaded surface 41, which formed a continuation of the threads of the bore 32. As the element 12 is formed of resilient material, the threaded surface 41 has a diameter which is slightly undersized, so that upon engagement with a threaded shank 42 (see FIGURE 5), the same will become slightly distended and simultaneously effect a seal between itself and the threads of the shank 42.

From a consideration of FIGURE 4, it will be observed that there is provided a reservoir space 42 in the recess 27 which is filled by the distortion of the resilient nut element 12 upon installation.

The device is installed in a normal manner, in which the resilient nut element 12 is first threaded upon the shank 42 and tightened using any suitable tool (not shown). The engagement of the nut element 12 immediately forms a hermetic seal with the thread of the shank 42, and as the nut element 12 is distorted by contact with the plate 44, a hermetic seal is formed by the end surface 38 as well. Once completely installed, the resilient nut element 12 is completely concealed from contact, and thus accidental contact of the metallic nut element 11 with any object will cause no damage to the resilient nut element 12, or interfere with its function.

I wish it to be understood that I do not consider the invention limited to the precise details of structure shown and set forth in this specification, for obvious modifications will occur to those skilled in the art to which the invention pertains.

What is claimed is:

A threaded sealing device for use with a threaded shank projecting through an opening in a surrounding member having a pair of substantially planar end surfaces perpendicular to the axis of said threaded shank, comprising: a metallic nut element and a resilient nut element; said nut elements having a continuous threaded bore extending therethrough, there being an annularly-shaped recess extending into the body of said metallic nut element and coaxially positioned with respect to said threaded bore, said recess being of a given volume; said resilient nut element being bonded to said metallic nut element, and at least partially disposed within said recess, said resilient nut element being of volume substantially equal to that of said recess, said resilient nut element having a configuration when in unstressed condition projecting axially outwardly of said recess; said recess including an innermost portion thereof bounded by a first wall perpendicular to the axis of said threaded bore and communicating with said bore, a second wall angularly inclined and connecting with said first wall, a third wall parallel to said first wall, and connecting with said second wall, and a fourth wall angularly inclined opposite to said second wall and joining said third wall, whereby said second and fourth walls diverge in the direction of the open end of said recess; said resilient nut element having a cross-sectional configuration corresponding in unstressed condition to said innermost part of said recess, and being free of interconnection with a portion of said fourth wall; whereupon the engagement of said metallic nut element with a threaded shank and the movement of said resilient nut element against said surrounding member, said resilient nut element is distorted to substantially fill said recess and effect a seal between said member and said metallic nut element.

References Cited by the Examiner
UNITED STATES PATENTS

| | | | |
|---|---|---|---|
| 2,348,308 | 5/1944 | Richardson | 151—7 |
| 2,464,379 | 3/1949 | Courtot | 151—7 |
| 2,751,806 | 6/1956 | Dickie | 85—9 |
| 2,949,325 | 8/1960 | Nenzell. | |
| 2,995,057 | 8/1961 | Nenzell | 85—9 |
| 3,004,574 | 10/1961 | Flick et al. | 151—7 |
| 3,004,776 | 10/1961 | Sebardt | 151—7 |

CARL W. TOMLIN, *Primary Examiner.*

R. S. BRITTS, *Assistant Examiner.*